(12) United States Patent
Hakkani-Tur et al.

(10) Patent No.: US 7,562,017 B1
(45) Date of Patent: *Jul. 14, 2009

(54) ACTIVE LABELING FOR SPOKEN LANGUAGE UNDERSTANDING

(75) Inventors: Dilek Z. Hakkani-Tur, Parsippany, NJ (US); Mazin G. Rahim, Warren, NJ (US); Gokhan Tur, Parsippany, NJ (US)

(73) Assignee: AT&T Intellectual Property II, L.P., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/862,656

(22) Filed: Sep. 27, 2007

Related U.S. Application Data

(63) Continuation of application No. 10/447,889, filed on May 29, 2003, now Pat. No. 7,292,982.

(51) Int. Cl.
G06F 17/21 (2006.01)
G06F 17/27 (2006.01)
G10L 15/08 (2006.01)

(52) U.S. Cl. .............................. 704/257; 704/9; 704/10

(58) Field of Classification Search .................. 704/257
See application file for complete search history.

(56) References Cited

U.S. PATENT DOCUMENTS

| | | |
|---|---|---|
| 4,803,729 A | 2/1989 | Baker |
| 5,263,117 A | 11/1993 | Nadas et al. |
| 5,317,673 A | 5/1994 | Cohen et al. |
| 5,625,748 A | 4/1997 | McDonough et al. |
| 5,715,367 A | 2/1998 | Gillick et al. |
| 5,960,397 A | 9/1999 | Rahim |
| 6,941,266 B1 | 9/2005 | Gorin et al. |

OTHER PUBLICATIONS

A.L. Gorin, A. Abella, T. Alonso, G. Riccardi, and J.H. Wright, "Automated Natural Spoken Dialog," IEEE Computer Magazine, vol. 35, No. 4, pp. 51-56, Apr. 2002.
A.L. Gorin, G. Riccardi, and J. H. Wright, "How May I Help You?," Speech Communication, 1997.
S. Abney, R. Schapire, and Y. Singer, "Boosting Applied to Tagging and PP Attachment," in Proceedings of the Joint SIGDAT Conference on Empirical Methods in Natural Language Processing and Very Large Corpora, pp. 38-45. 1999.
R. Schapire and Y. Singer, "BoosTexter: A Boosting-Based System for Text Categorization," Machine Learning, vol. 39, No. 2/3, pp. 135-168, 2000.
E. Eskin, "Detecting Errors Within a Corpus using Anomaly Detection," in Proceedings of the NAACL, Seattle, WA, Apr. 2000.
M. Murata, M. Utiyama, K. Uchimoto, Q. Ma and H. Isahara, "Correction of Errors in a Modality Corpus Used for Machine Translation by Using Machine-learning Method," in Proceedings of the TMI, Japan, Mar. 2002.
H. van Halteren, "The Detection of Inconsistency in Manually Tagged Text", in Proceedings of the Workshop on Linguistically Interpreted Corpora (LINC'00), Luxembourg, Aug. 2000.

*Primary Examiner*—David R Hudspeth
*Assistant Examiner*—Justin W Rider

(57) ABSTRACT

An active labeling process is provided that aims to minimize the number of utterances to be checked again by automatically selecting the ones that are likely to be erroneous or inconsistent with the previously labeled examples. In one embodiment, the errors and inconsistencies are identified based on the confidences obtained from a previously trained classifier model. In a second embodiment, the errors and inconsistencies are identified based on an unsupervised learning process. In both embodiments, the active labeling process is not dependent upon the particular classifier model.

14 Claims, 5 Drawing Sheets

US 7,562,017 B1

ACTIVE LABELING FOR SPOKEN LANGUAGE UNDERSTANDING

PRIORITY CLAIM

The present application is a continuation of U.S. patent application Ser. No. 10/447,889, filed May 29, 2003, the contents of which are incorporated herein by reference in their entirety.

FIELD OF THE INVENTION

The present invention relates generally to spoken language understanding systems and more particularly to active labeling for spoken language understanding systems.

BACKGROUND OF THE INVENTION

Natural language spoken dialog systems enable customers to express what they want in spoken natural language. Such systems automatically extract the meaning from speech input and act upon what people actually say, in contrast to what one would like them to say, shifting the burden from users to the machine user interface. In a natural language spoken dialog system, identifying the customer's intent can be seen as a general intent classification problem.

When statistical classifiers are employed to identify customer intent, they are typically trained using large amounts of task data that is transcribed and labeled by humans, a very expensive and laborious process. Here, labeling generally refers to the assignment of one or more predefined classification labels (e.g., calltypes) to each utterance.

It is clear that the bottleneck in building a decent statistical system is the time spent for high quality labeling. Due to a process that is naturally prone to errors, each one of the labels is usually verified by an independent party to achieve an acceptable level of quality.

An utterance can be mislabeled for many reasons, including simple labeler error and an imperfect description of classification types. It should also be noted that for multi-label tasks, where an utterance may get more than one label, it is necessary to label the utterance with all appropriate labels. If any of the labels is missing, it is considered a labeling error.

For these reasons, usually a second (or maybe more) pass(es) of labeling is required in order to check and fix the labeling errors and inconsistencies of the first (or earlier) pass(es). The motto "There is no data like more data" will generally hold only if the additional data is less "noisy", i.e., the data contains less than a tolerable number of mislabeled utterances. Most state-of-the-art classifiers can tolerate a few percentage points of noisy data, but more significant error levels can ruin the classification performance no matter how robust the classifiers are.

SUMMARY

Labeling is an error-prone process due to various reasons, such as labeler errors or imperfect description of classes. In accordance with the present invention, the labeling effort is enhanced through a process that identifies and corrects errors and inconsistencies while checking a minimum amount of data. This active labeling process is not dependent upon the particular classifier model.

In one aspect of the present invention, the errors and inconsistencies are identified based on the confidences obtained from a previously trained classifier model. In a second aspect of the present invention, the errors and inconsistencies are identified based on an unsupervised learning process. In both scenarios, the active labeling process aims to minimize the number of utterances to be checked again by automatically selecting the ones that are likely to be erroneous or inconsistent with the previously labeled examples.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

A preferred embodiment of the invention is discussed in detail below. While specific implementations are discussed, it should be understood that this is done for illustration purposes only. A person skilled in the relevant art will recognize that other components and configurations may be used without parting from the spirit and scope of the invention.

State-of-the-art spoken language understanding (SLU) systems are trained using human-labeled utterances, the preparation of which is labor intensive and time consuming. As noted, labeling is an error-prone process due to various reasons (e.g., labeler error or the imperfect description of classes). Thus, usually a second (or maybe more) pass(es) of labeling is required in order to check and fix the labeling errors and inconsistencies of the first (or earlier) pass(es).

In accordance with the present invention, an active labeling process is provided that reduces the labeling effort in a statistical classification system. In general, active labeling aims to minimize the number of utterances to be checked again by automatically selecting the utterances that are likely to be erroneous or inconsistent with previously labeled examples, hence reducing the amount of human labeling effort. This process enables the building of better classification systems in a shorter time frame and at reduced costs.

Two alternative active labeling embodiments are described below. In both of these embodiments, it is assumed that there exists a set of labeled but unchecked utterances, which probably contain some amount of errors and inconsistencies. The first embodiment, which relates to certainty-based active labeling, also assumes a readily available prior classification model trained with human-labeled and checked data, while the second embodiment, which relates to unsupervised active labeling, is completely unsupervised and does not need any prior model. It should further be noted that both active-labeling embodiments can be implemented in a manner that is independent of the classifier used.

Figure 1:
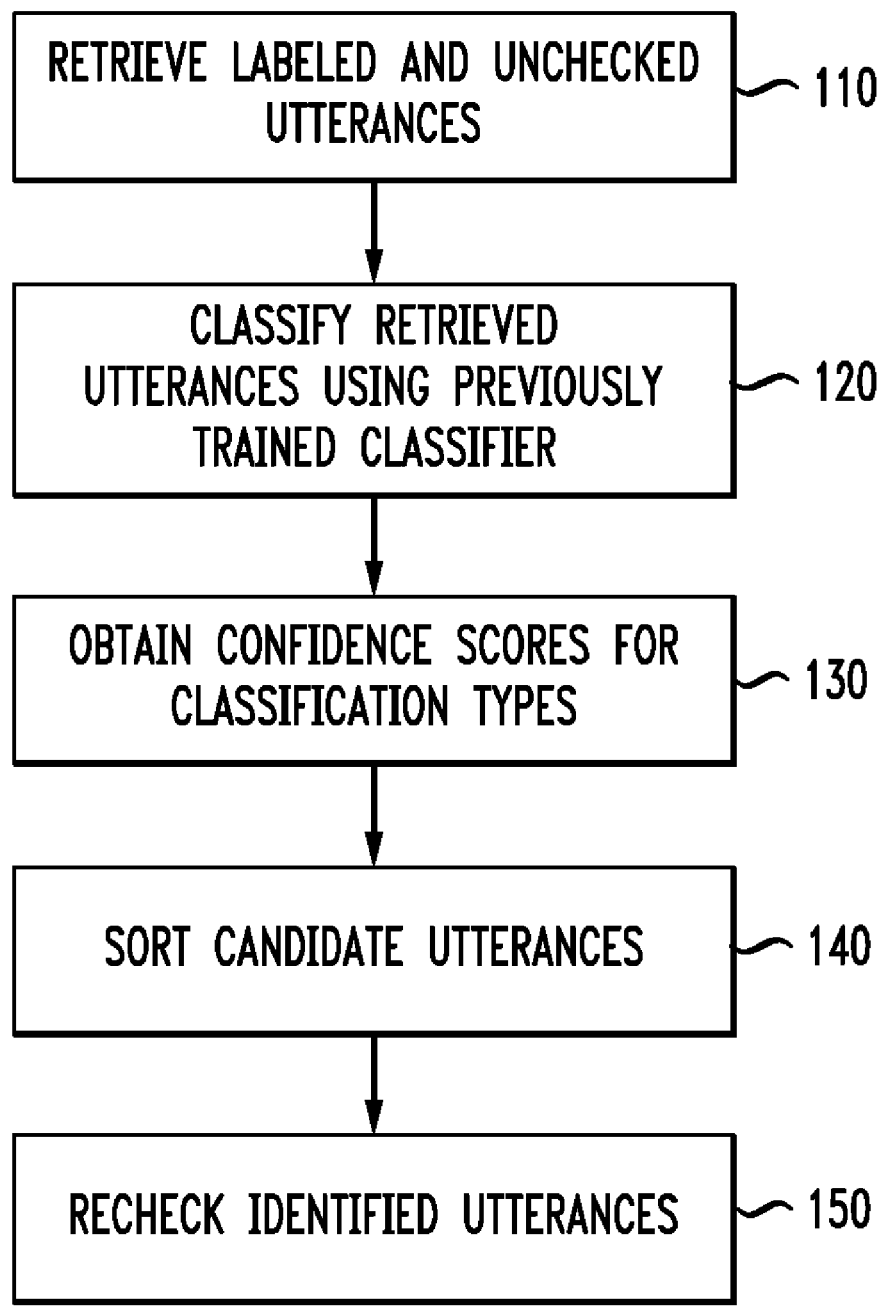
FIG. 1 illustrates a processing flowchart of a first embodiment of the present invention.

The first embodiment is now described with reference to the flowchart illustrated in FIG. 1. One of the aims of the first embodiment is to select a set of utterances that the classifier is confident about but are in disagreement with the first labeler's decision. This selection process leaves out the utterances where the classifier agrees with the labeler's decision with high confidence.

This process begins at step 110 where previously labeled yet unchecked utterances are retrieved. Next, at step 120, the retrieved utterances are classified using a previously trained classifier. In one embodiment, the classifier is trained using the previous portions of training data.

As noted, the embodiments of the present invention are not dependent on the use of a particular classifier. In the first embodiment, confidence scores are used. These confidence scores may be generated by a classifier, for example, which returns a confidence, Q(i|U), between 0 and 1 for each of the labels, i∈L, where L is the set of all classification types (e.g., calltypes), for a given utterance, U.

As would be appreciated by one of ordinary skill in the relevant art, confidence scores may also be derived from output generated by a particular classifier. In this case, the classifier indirectly produces the confidence scores.

Regardless of whether the particular classifier directly or indirectly produces confidence scores, at step 130, the confidence scores are obtained for each classification type. For example, in a telecommunications application such as AT&T's "How May I Help You?" (HMIHY) service, confidence scores are obtained for each calltype, such as billing, collect call, rate information, etc.

The classifier confidence scores are then used to predict which candidate utterances are classified with high/low confidence. Specifically, at step 140, the candidate utterances are sorted based on an analysis of the classifier confidence scores for all the classification types and the first labeler's decision.

Various criteria can be used to sort the candidate utterances for further checking. In the description below, various examples of possible criteria are presented as examples. These examples are not intended to be exhaustive of the potential sorting criteria that could be applied to produce a set of candidate utterances to be rechecked. Indeed, the particular sorting criteria can be specifically designed to produce specifically targeted outputs intended to meet a particular labeling deficiency or the available resources for rechecking the identified utterances.

In a first example, it is possible to select the utterances where the classifier's top choice is not among the classification types that the labeler has selected. This criterion works fine for most cases, but may miss one type of error for multi-label tasks. Specifically, it is sometimes possible for the second-pass labeler to add an additional calltype to that utterance. Even though the classifier's top choice matches one of the labels of the first pass with high enough confidence, this does not mean that this utterance has been labeled correctly.

Alternatively, it is possible to select the utterances where the first pass labeler's choices (some or all) get some confidence scores greater than some threshold. Similar to the previous example, this criterion may also not be sufficient. There may also exist cases where there is another classification type that gets an even higher confidence score and should be added to the true classification types.

As seen by this brief set of examples, it may be advantageous to consider all the confidence scores of all the classification types. Thus, in one embodiment, a generalized selection and sorting criterion can be used. This generalized selection and sorting criterion can be based on the Kullback-Leibler (KL) divergence (or binary relative entropy) between the first pass labels, P, and the classifier outputs, Q. More formally, the KL divergence computation can be expressed as:

$$KL(P \| Q) = \sum_{i \in L} p_i \times \log\left(\frac{p_i}{q_i}\right) + (1 - p_i) \times \log\left(\frac{1 - p_i}{1 - q_i}\right)$$

where L is the set of all classification types, $q_i$ is the probability of the $i^{th}$ classification type obtained from the classifier, and p=1 if that classification type is previously labeled and p=0 if otherwise.

With this KL-divergence criterion, all of the utterances where the computation is greater than some threshold will be designated for rechecking. The set of all identified utterances are then rechecked at step 150.

At this point it should be recognized that the set of all utterances that have been identified by the particular sorting criteria represents just a small subset of the data. Thus, the principles of the present invention enable a large percentage of the labeling errors or inconsistencies in the data to be examined by checking only a portion of the overall data. This facilitates a rapid and cost-effective mechanism for training a SLU system.

Figure 2:
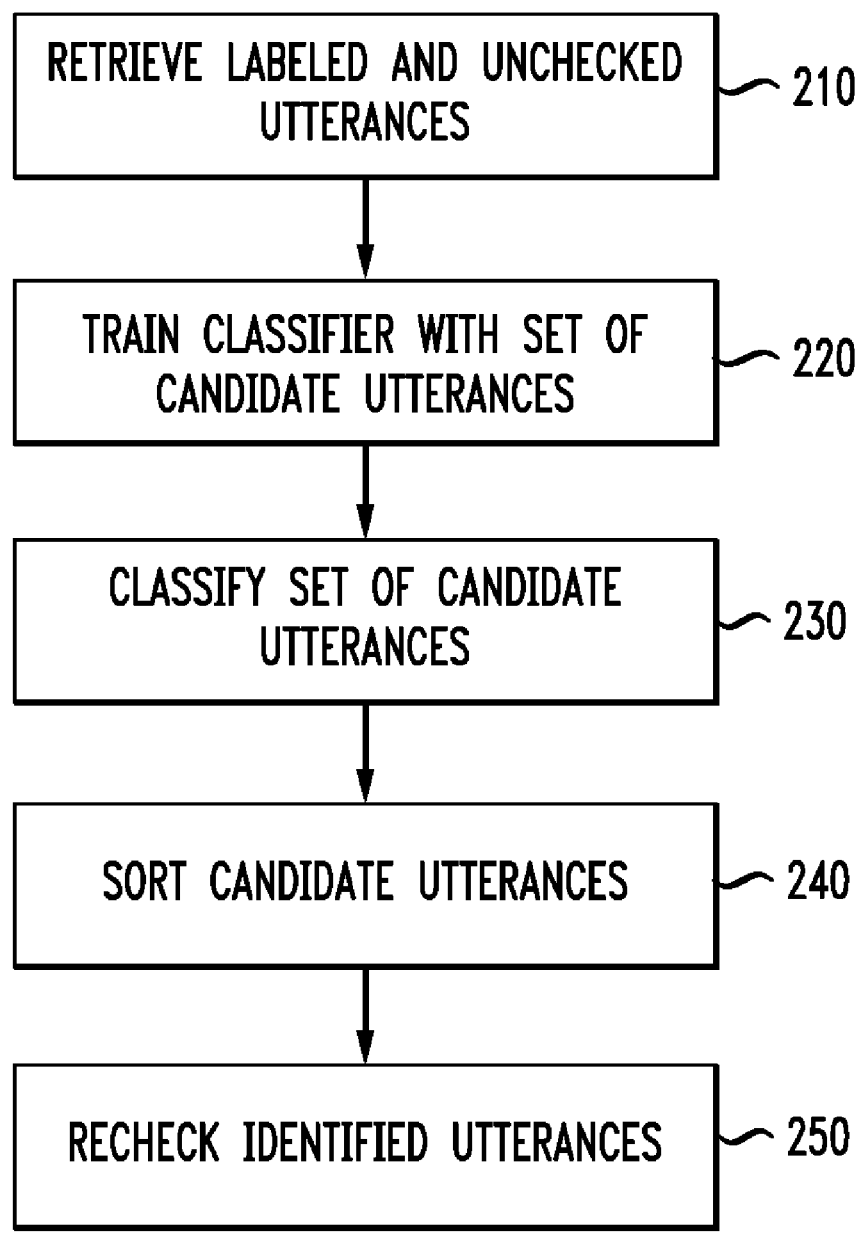
FIG. 2 illustrates a processing flowchart of a second embodiment of the present invention.

In a second active-labeling embodiment, it is assumed that there is no readily available classifier model. In other words, only a set of labeled and unchecked utterances with some amount of errors and inconsistencies is available. In this case, a different active labeling method is employed. This alternative active labeling method is described below with reference to the flowchart of FIG. 2.

As illustrated, the process begins at step 210 where previously labeled yet unchecked utterances are retrieved. Next, at step 220, a classifier is trained using the set of candidate utterances as if it is the training data.

The set of candidate utterances is then classified with the now-trained classifier at step 230. In other words, the same noisy data used to train the classifier is now classified by that same classifier. The reasoning here is that the utterances in the training data which are not classified correctly are more probably the labeling errors.

Accordingly, at step 240, the classified utterances are sorted by determining which of the classified utterances have classifications that are distinct from the labels that have been assigned to the original data. If the classifications do not match, then that utterance will be designated for rechecking. The set of all identified utterances are then rechecked at step 250 to resolve the error or inconsistency.

Here, it should be noted again that the second active-labeling embodiment does not require the use of a particular type of classifier. Rather, the process described above can be applied to any generic classifier.

It should further be noted that the second active-labeling embodiment does not require any human-labeled high quality data. Rather, the classifier is trained using labeled but unchecked data. Thus, the technique incorporated by the second active-labeling embodiment can be referred to as unsupervised active labeling.

Similar to the first active labeling embodiment, it is also to possible to put a threshold if the classifier is iterative, such as the classifier disclosed in R. E. Schapire and Y. Singer, "Boos-Texter: A Boosting-Based System For Text Categorization," *Machine Learning*, Vol. 39, No. 2/3, pp. 135-168, 2000, which is incorporated herein by reference in its entirety. In such cases, the classifier may continue training with noisy data until the error rate for the training data is less than some threshold, and the utterances which are not classified as in their first pass labels are sent for a second pass of labeling. Alternatively, one may check the confidences of the labels and check the ones that are classified with a low confidence, similar to the first active labeling embodiment.

These active labeling embodiments have been evaluated using utterances from a natural dialog customer care system. This system aims to classify the user utterances into 32 calltypes in total. In the experiments, a set of 11,160 utterances was used, 90% of the utterances were used for training, while the remaining 10% was used for testing. In total, 11% of the utterances had more than one label, while there were 1.15 labels per utterance on average. In all the experiments, Schapire's BoosTexter classifier was used along with n-grams of the utterances as features.

Before implementing any of the active labeling methods, the effect of the labeling errors to the classification performance was also checked. For this purpose, the classifier was trained using the first-pass labels and second-pass corrected labels, the difference being checked.

As a result, 13% of the utterances were corrected in the test data, while 9% of them were changed completely (i.e., there was no common label left between the first and second passes). This is a big noise rate and suggests that a second pass of checking is crucial to train decent classifier models. It should also be noted that there were probably more labeling errors even after the second pass.

Figure 3:
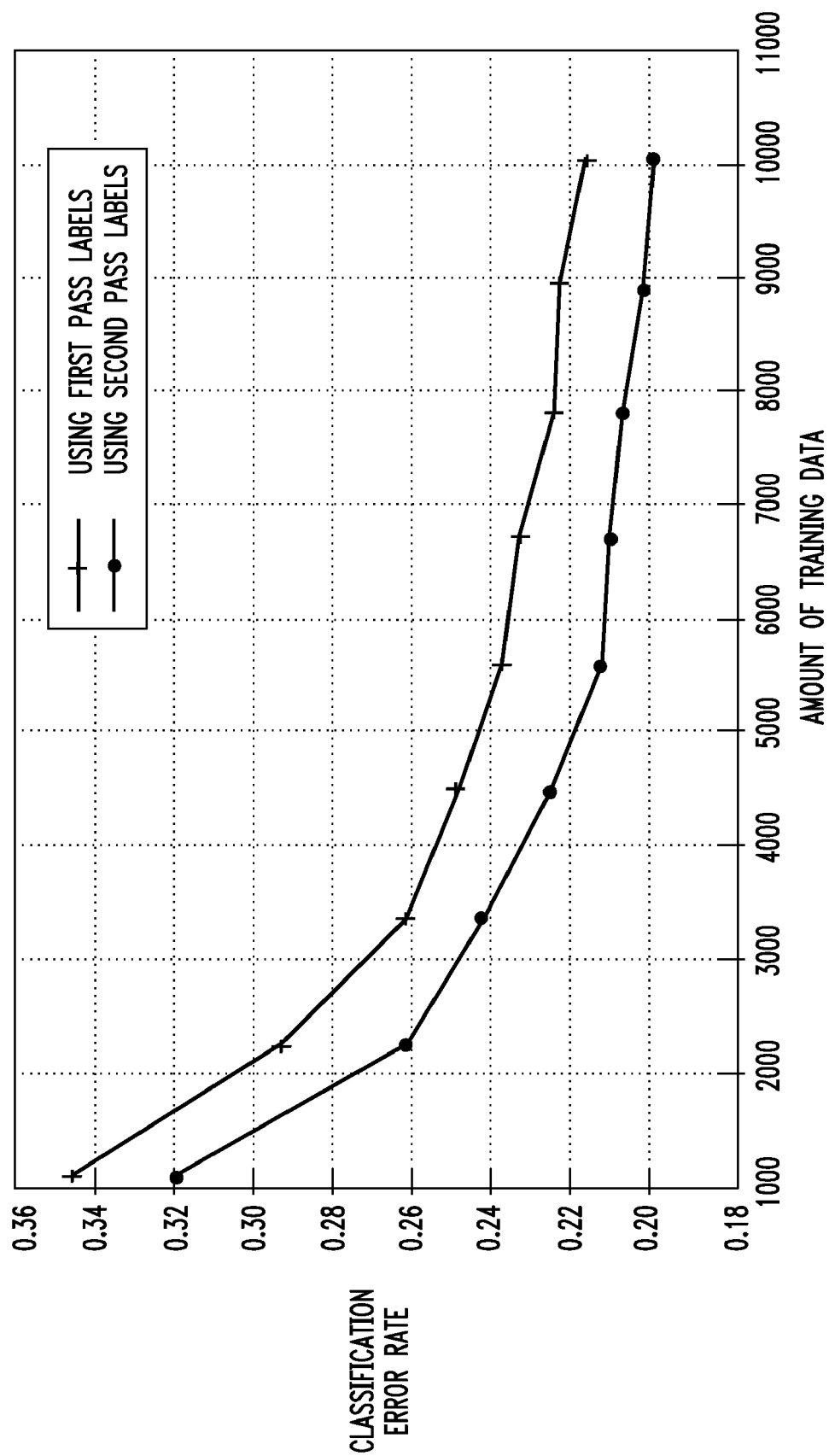
FIG. 3 illustrates a graph that shows the effect of labeling errors to classification performance.

FIG. 3 illustrates a graph that shows the classification performances using checked and unchecked training data. As illustrated, using unchecked labels, the classification error rate increases by 2%-3% points absolute, that is, about 10% relative reduction in the performance. In other words, the classifier needs twice as much unchecked data in order to obtain the same performance with checked data. These results justify the motivations for active labeling.

Figure 4:
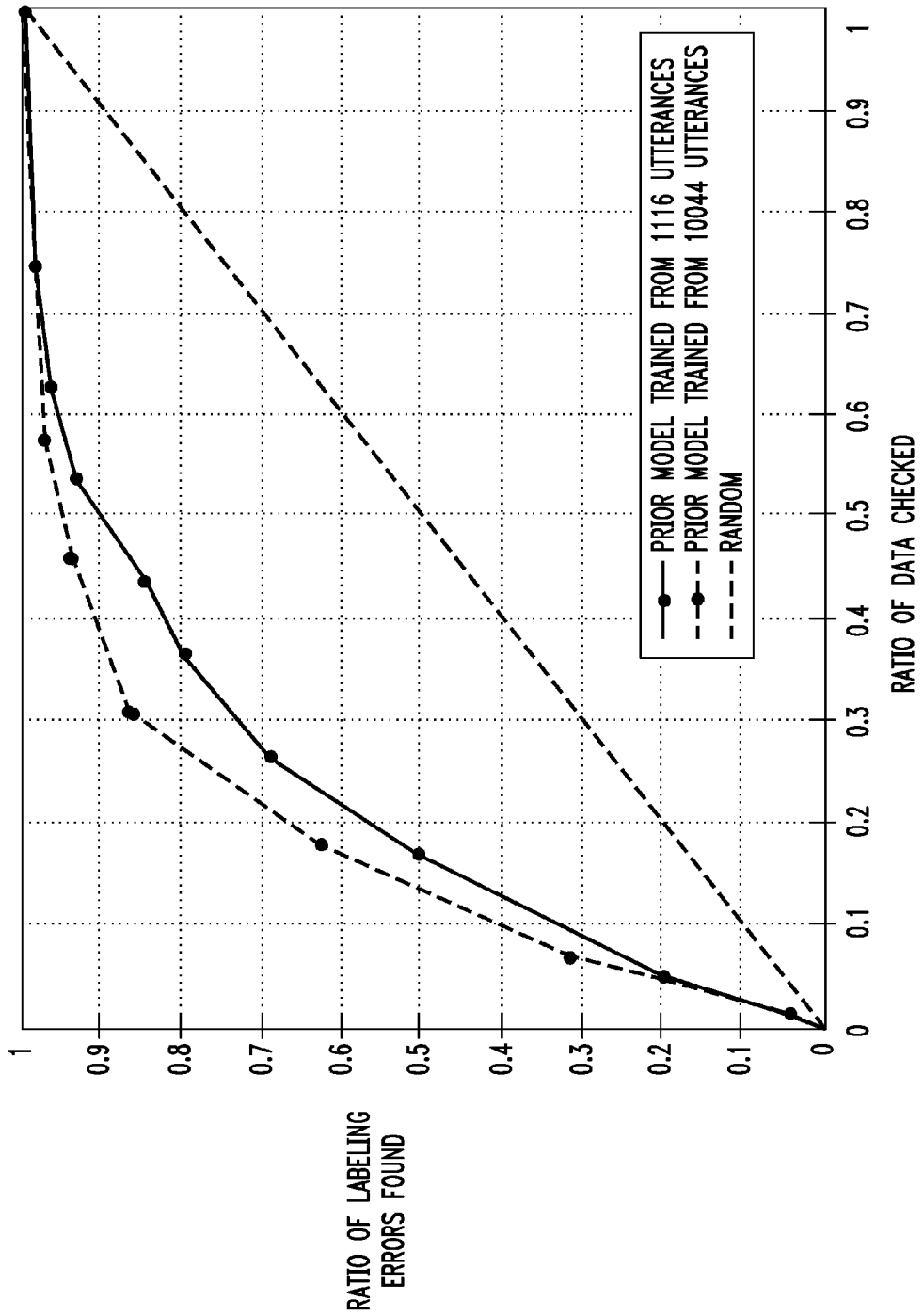
FIG. 4 illustrates a graph that shows the results of experiments using the first active labeling embodiment.

FIG. 4 illustrates a graph that shows the results of experiments using the first active labeling embodiment. As illustrated, the graph draws the ratio of labeling errors found with respect to the ratio of utterances checked. The diagonal dashed line is the baseline where both ratios are equal. This is the performance you may expect without active labeling. These curves were drawn by putting a threshold on the KL divergence.

The solid line is obtained using a prior classification model trained using 1,116 utterances and the dashed line is obtained using all 10,044 utterances. The curves for prior model data sizes between these have not been drawn, since those curves lie in-between, as expected. For both curves, this active labeling embodiment outperforms the baseline, even using just 1,116 utterances, and finds about 90% of the errors using just half the data, or finds 75% of the errors checking one third of the utterances. Furthermore, the active labeling performance increases as the prior model gets better with more data. The ratio of labeling errors found increases from 72% to 83% by using a better prior model when 30% of the utterances are checked.

Figure 5:
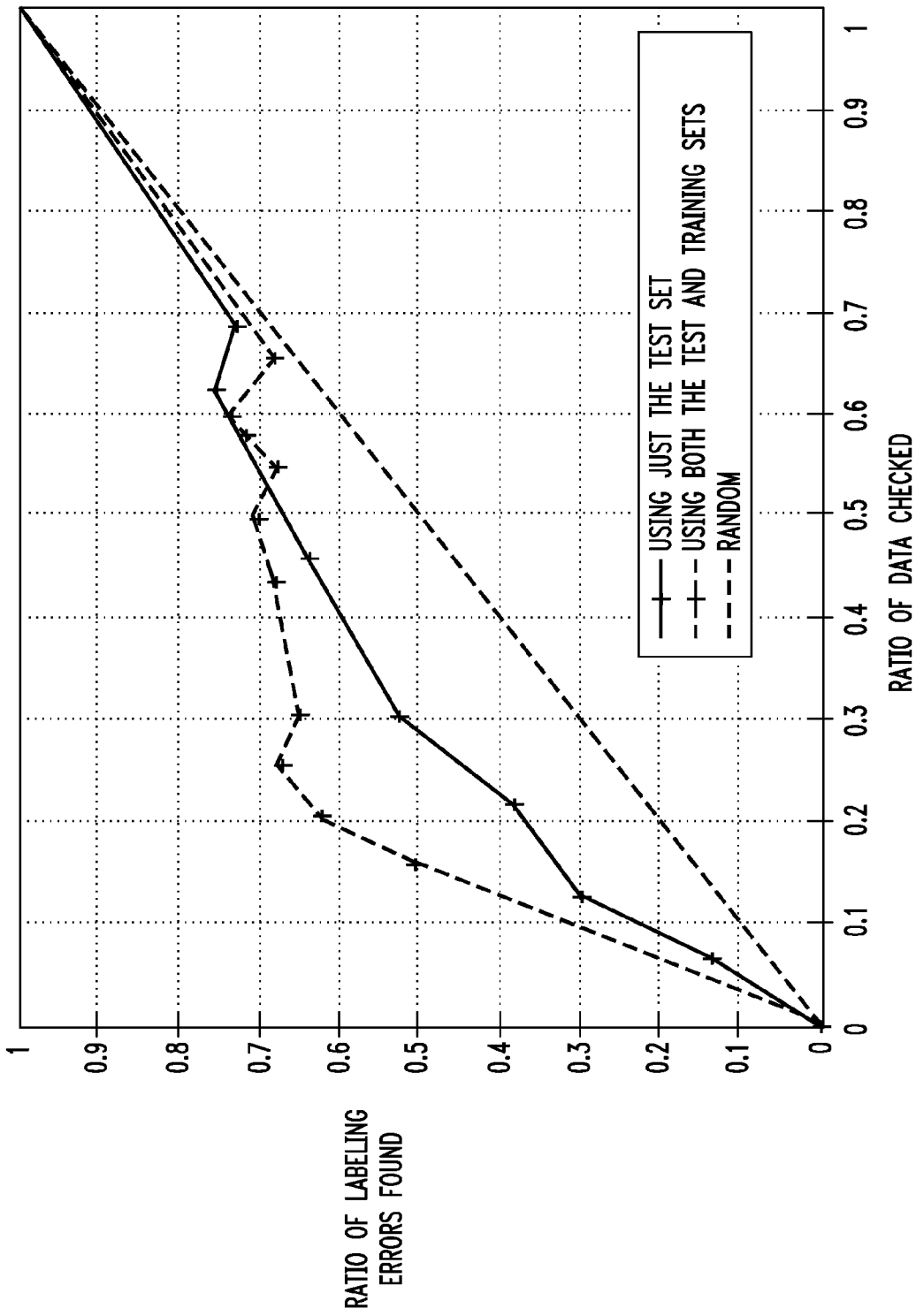
FIG. 5 illustrates a graph that shows the results of experiments using the second active labeling embodiment.

FIG. 5 illustrates a graph that shows the results of experiments using the second active labeling embodiment. Two curves have been drawn by different numbers of Boosting iterations. The solid line is obtained using just the test data. The dashed line is obtained by using all 11,160 utterances, but then evaluating only on the test set. This method outperforms the baseline, but underperforms the first active labeling embodiment. It finds about 70% of the errors using just half the data, or finds about ⅔ of the errors checking ⅓ of the utterances. In order to see the effect of the number of the candidate utterances used in this method to the performance, we have varied the candidate utterance set size, but only checked the performance on the test set to get comparable results. At 30% of the data checked, the ratio of labeling errors found increases about 10% absolute using a greater number of utterances.

As thus described, two active labeling methods have been identified for reducing the number of utterances to be checked by automatically selecting the ones that are likely to be erroneous or inconsistent with the previously labeled examples. The results have shown that it is possible to speed up the second pass of labeling significantly. The results further indicate that it is possible to find about 90% of the labeling errors using just half the data. These results are especially important when there is little time for noise-free labeling. It is also clear that these methods can be used to clean up and even correct already labeled data as a post-processing step. The first active labeling embodiment is especially suitable for that purpose. Furthermore, these methods are general and can be used for any available classification task.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or a combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the preferred embodiments of the invention may be described with reference to a SLU component within a spoken dialog system. However, the invention may have applicability in a variety of environments where SLU may be used. Therefore, the invention is not limited to SLU within any particular application. Accordingly, the appended claims and their legal equivalents only should define the invention, rather than any specific examples given.

What is claimed is:

1. A classifier associated with automatic speech recognition (ASR), the classifier comprising:
   a processor;
   a module configured to control the processor to select a first set of reference utterances, each labeled with at least one classification type;
   a module configured to control the processor to generate, based on a trained classifier, a confidence score for a plurality of classification types for each of the first set of reference utterances; and
   a module configured to control the processor to identify a second set of candidate utterances from the first set of reference utterances as having a potential classification error, wherein the identifying is based on an analysis of previously assigned classification types and generated confidence scores.

2. The classifier of claim 1, wherein the confidence score is generated by the trained classifier.

3. The classifier of claim 1, wherein the confidence score is calculated based on an output of the trained classifier.

4. A system associated with speech classification, the system comprising:
   a processor;
   a module configured to control the processor to select a first set of candidate utterances, each of the first set of candidate utterances labeled with at least one previously assigned classification type;
   a module configured to control the processor to train a classifier using the first set of candidate utterances to produce a trained classifier;
   a module configured to control the processor to classify the first set of candidate utterances using the trained classifier; and
   a module configured to control the processor to identify a second set of candidate utterances from the first set of candidate utterances as having a potential classification error, wherein the identifying is based on an analysis of the previously assigned classification types and the results of the classifying.

5. The system of claim 4, wherein the first set of candidate utterances includes labeled and unchecked data.

6. The system of claim 4, wherein the classifier is an iterative classifier.

7. The system of claim 4, further comprising a module configured to control the processor to generate, based on a trained classifier, a confidence score for a plurality of classification types for each of the first set of candidate utterances.

8. The system of claim 4, wherein the classification types include call classification types.

9. A system that classifies use input, the system comprising:
   a processor;
   a module configured to control the processor to classify a set of candidate utterances using a classifier, the set of candidate utterances including labeled and unchecked data; and
   a module configured to control the processor to automatically select a subset of the set of candidate utterances as likely including erroneous or inconsistent classifications, the automatic selection being based on an analysis of an output of the classifier.

10. The system of claim 9, wherein the classifier is an iterative classifier.

11. The system of claim 9, wherein the output of the classifier includes confidence scores.

12. The system of claim 9, wherein the output of the classifier includes information used to derive confidence scores.

13. The system of claim 9, wherein the output of the classifier includes classification labels.

14. A spoken language understanding system having a processor and modules configured to control the processor, the system generated by a method comprising:
   retrieving a labeled and unchecked set of candidate utterances;
   training a classifier using the candidate utterances;
   classifying the set of candidate utterances;
   sorting the classified utterances by determining which of the classified utterances have classifications that are distinct from labels in the labeled and unchecked set of candidate utterances; and
   rechecking utterances that have classifications that do not match.

* * * * *